(12) United States Patent
Miyamoto et al.

(10) Patent No.: US 10,852,131 B2
(45) Date of Patent: Dec. 1, 2020

(54) INFORMATION PROCESSING APPARATUS AND INFORMATION PROCESSING METHOD

(71) Applicant: SONY CORPORATION, Tokyo (JP)

(72) Inventors: Kohei Miyamoto, Kanagawa (JP); Hisako Sugano, Kanagawa (JP); Motohiko Watanabe, Tokyo (JP); Honglei Sun, Kanagawa (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 15/748,269

(22) PCT Filed: Jun. 28, 2016

(86) PCT No.: PCT/JP2016/069167
§ 371 (c)(1),
(2) Date: Jan. 29, 2018

(87) PCT Pub. No.: WO2017/029887
PCT Pub. Date: Feb. 23, 2017

(65) Prior Publication Data
US 2018/0216931 A1  Aug. 2, 2018

(30) Foreign Application Priority Data

Aug. 19, 2015 (JP) .................................. 2015-161827

(51) Int. Cl.
 *G01B 21/20* (2006.01)
(52) U.S. Cl.
 CPC .................................. *G01B 21/20* (2013.01)

(58) Field of Classification Search
 CPC ......... G01B 21/20; G06T 17/00; G06T 17/10; G06T 17/20; G06F 3/017; G06K 9/00335
 See application file for complete search history.

(56) References Cited

U.S. PATENT DOCUMENTS 8,588,464 B2 * 11/2013 Albertson .............. A61H 3/061
 340/435
9,721,383 B1 * 8/2017 Horowitz ................ G06T 17/20
 (Continued)

FOREIGN PATENT DOCUMENTS

JP  2003-061936 A  3/2003
JP  2005-189205 A  7/2005
 (Continued)

OTHER PUBLICATIONS

Weise, et al, "Fast 3D Scanning with Automatic Motion Compensation", 08 pages.
 (Continued)

*Primary Examiner* — Mohamed Charioui
(74) *Attorney, Agent, or Firm* — Chip Law Group

(57) ABSTRACT

An information processing apparatus includes a first acquisition unit that acquires three-dimensional shape information indicating a result of measurement of a three-dimensional shape of an object, a second acquisition unit that acquires information indicating a motion of the object corresponding to the three-dimensional shape information acquired by the first acquisition unit, and a processing unit that processes the three-dimensional shape information acquired by the first acquisition unit, on a basis of the information indicating the motion of the object acquired by the second acquisition unit.

15 Claims, 8 Drawing Sheets

(56) References Cited

U.S. PATENT DOCUMENTS

2014/0307920 A1* 10/2014 Holz ................. G06K 9/00335
382/103
2015/0286859 A1* 10/2015 Zaytsev ................. G06F 3/017
382/103

FOREIGN PATENT DOCUMENTS

| JP | 2007-240344 A | 9/2007 |
| JP | 2011-127932 A | 6/2011 |
| JP | 2013-024655 A | 2/2013 |
| JP | 2014-182115 A | 9/2014 |

OTHER PUBLICATIONS

Weise, et al., "Fast 3D Scanning With Automatic Motion Compensation", Swiss Federal Institute of Technology, 08 pages.
International Search Report and Written Opinion of PCT Application No. PCT/JP2016/069167, dated Sep. 20, 2016, 08 pages.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/069167 filed on Jun. 28, 2016, which claims priority benefit of Japanese Patent Application No. JP 2015-161827 filed in the Japan Patent Office on Aug. 19, 2015. Each of the above-referenced applications is hereby incorporated herein by reference in its entirety.

TECHNICAL FIELD

The present disclosure relates to an information processing apparatus, an information processing method, and a program.

BACKGROUND ART

In recent years, a technology for scanning a three-dimensional shape of an object at a high speed has been widely utilized. Such a technology is utilized to enable operation based on gesture of a user in the field of game, for example. In such a scan technology, it is desired to improve the accuracy of three-dimensional shape measurement particularly targeting a moving object.

With regard to this, for example, Patent Literature 1 below discloses a technology that relates to a measurement method that measures a three-dimensional shape of an object by projecting a projection pattern and acquiring a reflection pattern reflected from the object, and measures a three-dimensional shape of a moving object with high accuracy by modifying a projection phase pattern.

Also, Patent Literature 2 below discloses a technology that relates to the same measurement method, and measures a three-dimensional shape of an object at a high speed by modifying a processing method of an obtained reflection pattern.

Also, Non-Patent Literature 1 below discloses a technology that improves measurement accuracy by assuming a moving direction of a moving object.

CITATION LIST

Patent Literature

Patent Literature 1: JP 2011-127932A
Patent Literature 2: JP 2013-024655A

Non-Patent Literature

Non-Patent Literature 1: Weise, T.; ETH Zurich, Zurich; Leibe, B.; Van Gool, L., "Fast 3D Scanning with Automatic Motion Compensation", Computer Vision and Pattern Recognition, 2007., IEEE Conference on June 2007.

DISCLOSURE OF INVENTION

Technical Problem

However, in the above technology field, further improvement of measurement accuracy is desired. Thus, a new and improved information processing apparatus, information processing method, and program, which are capable of further improving measurement accuracy of a three-dimensional shape of a moving object, are proposed.

Solution to Problem

According to the present disclosure, there is provided an information processing apparatus including: a first acquisition unit configured to acquire three-dimensional shape information indicating a result of measurement of a three-dimensional shape of an object; a second acquisition unit configured to acquire information indicating a motion of the object corresponding to the three-dimensional shape information acquired by the first acquisition unit; and a processing unit configured to process the three-dimensional shape information acquired by the first acquisition unit, on a basis of the information indicating the motion of the object acquired by the second acquisition unit.

In addition, according to the present disclosure, there is provided an information processing method including: acquiring three-dimensional shape information indicating a result of measurement of a three-dimensional shape of an object; acquiring information indicating a motion of the object corresponding to the acquired three-dimensional shape information; and processing, by a processor, the three-dimensional shape information on a basis of the acquired information indicating the motion of the object.

In addition, according to the present disclosure, there is provided a program for causing a computer to function as: a first acquisition unit configured to acquire three-dimensional shape information indicating a result of measurement of a three-dimensional shape of an object; a second acquisition unit configured to acquire information indicating a motion of the object corresponding to the three-dimensional shape information acquired by the first acquisition unit; and a processing unit configured to process the three-dimensional shape information acquired by the first acquisition unit, on a basis of the information indicating the motion of the object acquired by the second acquisition unit.

Advantageous Effects of Invention

As described above, according to the present disclosure, it is possible to further improve the measurement accuracy of the three-dimensional shape of the moving object. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
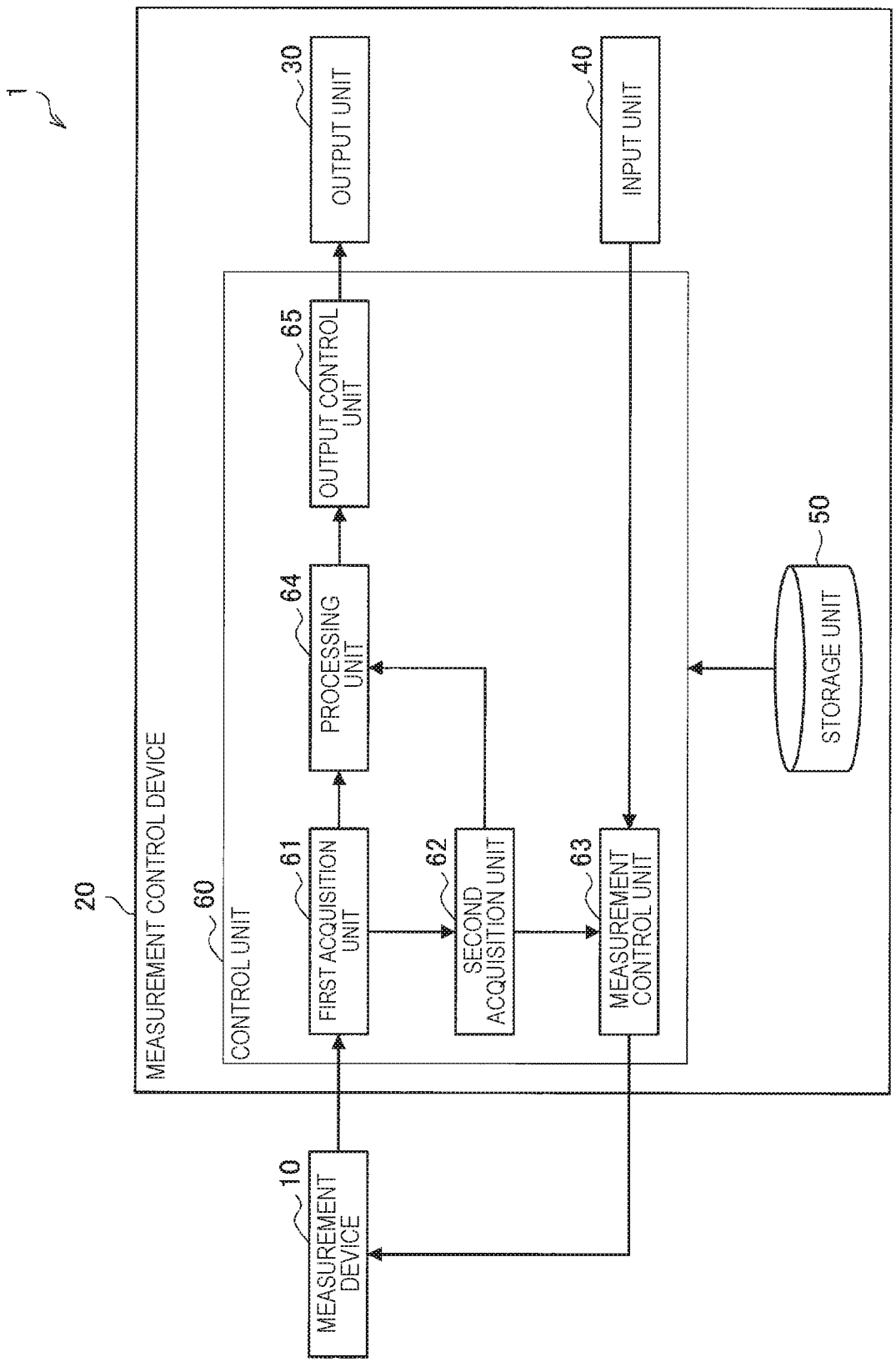
FIG. 1 is a block diagram illustrating an example of a logical configuration of a measurement system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Configuration Example
1.1. Configuration Example of Measurement Device
1.2. Configuration Example of Measurement Control Device
2. Technical Feature
3. Sequence of Process
4. Hardware Configuration Example
5. Conclusion <<1. Configuration Example>>

FIG. 1 is a block diagram illustrating an example of a logical configuration of a measurement system 1 according to the present embodiment. As illustrated in FIG. 1, the measurement system 1 includes a measurement device 10 and a measurement control device 20.

<1.1. Configuration Example of Measurement Device>

The measurement device 10 is a device that measures a three-dimensional shape of an object (what is called 3D scanning). The measurement device 10 can also be referred to as 3D scanner. The measurement device 10 performs measurement on the basis of a control signal received from the measurement control device 20, and transmits the result of the measurement to the measurement control device 20. The measurement device 10 can take various forms, such as a handy type or a dome (omnidirectional) type. Also, the measurement device 10 can employ various measurement methods, such as an active measurement method or a passive measurement method. Note that, in the case where a moving object that moves at a high speed is a measurement target, it is desirable to employ a high speed 3D scanning method, such as a one-shot active measurement method.

The object of the measurement target can be various moving objects including a living thing such as a person, an object that autonomously moves like a metronome, an object that moves by receiving a force from outside like a ball, or the like. Also, for example, the motion of the person can be, for example, walking, running, raising a hand, respiration, heartbeat, etc. As a matter of course, the object may be a stationary object.

<1.2. Configuration Example of Measurement Control Device>

The measurement control device 20 is a device that transmits a control signal to the measurement device 10 to cause the measurement device 10 to perform measurement, and acquires and processes the result of the measurement. As illustrated in FIG. 1, the measurement control device 20 includes an output unit 30, an input unit 40, a storage unit 50, and a control unit 60.

(1) Output Unit 30

The output unit 30 has a function for outputting a processing result by the control unit 60. For example, the control unit 60 outputs the processing result with an image (moving image/still image), text, sound, or the like.

(2) Input Unit 40

The input unit 40 has a function for accepting an information input from outside. For example, the input unit 40 accepts a user input of set information, such as a timing, the number of times, a period, or a target area (typically, a position and attitude of a scanner) of measurement.

(3) Storage Unit 50

The storage unit 50 has a function for temporarily or permanently storing a program and various data for the operation of the measurement control device 20. For example, the storage unit 50 stores information indicating a result of measurement acquired from the measurement device 10.

(4) Control Unit 60

The control unit 60 provides various functions of the measurement control device 20. The control unit 60 includes a first acquisition unit 61, a second acquisition unit 62, a measurement control unit 63, a processing unit 64, and an output control unit 65. Note that the control unit 60 can further include additional components other than these components. That is, the control unit 60 can perform operation other than the operation of these components.

The functions of the first acquisition unit 61, the second acquisition unit 62, the measurement control unit 63, the processing unit 64, and the output control unit 65 will be described in detail later.

<<2. Technical Feature>>

Next, the technical feature of the measurement system 1 according to the present embodiment will be described with reference to FIGS. 2 to 5.

(1) Measurement

The measurement device 10 measures a three-dimensional shape of an object. The measurement control device 20 (for example, the first acquisition unit 61) acquires three-dimensional shape information indicating the result of the measurement by the measurement device 10. The three-dimensional shape information is information indicating the three-dimensional shape of the object, which includes depth information, texture information, and the like, for example. This data may be the final data output by the measurement control device 20, or may be intermediate data. The measurement control device 20 (for example, the first acquisition unit 61) may recognize the coordinates of a three-dimensional point group, a polygon mesh obtained by linking those points, a normal vector of each polygon, and the like, on the basis of the depth information and the texture information, and set these as the three-dimensional shape information. The measurement device 10 stores the acquired three-dimensional shape information in the storage unit 50.

(2) Recognition of Motion Information

The measurement control device 20 (for example, the second acquisition unit 62) acquires information (hereinafter, also referred to as motion information) indicating the motion of the object. In particular, the measurement control device 20 acquires the motion information that corresponds to the acquired three-dimensional shape information. Specifically, the measurement control device 20 acquires the motion information indicating the motion of the object at a timing at which the three-dimensional shape of the object is measured. Thereby, the three-dimensional shape information and the motion information are associated with each other.

The motion information can include information indicating a property of the motion, and information indicating a motion state. For example, the information indicating the property of the motion can include information indicating the presence or absence of a motion, whether the motion is predictable or not in the case where the motion is present, and a motion pattern in the case where the motion is predictable. The information indicating the motion pattern can include a motion type, such as a cyclic motion, a constant speed motion, a constant acceleration motion, or a rotational motion, and various types of parameters, such as a cycle and an amplitude in the case of the cyclic motion, and a speed in the case of the constant speed motion, for example. The information indicating the motion state can include speed, acceleration, position, attitude, phase in a cyclic motion, or the like of the object, for example.

It is possible to conceive of various means for acquiring the motion information. For example, the measurement control device 20 may acquire (recognize) the motion information on the basis of a plurality of pieces of three-dimensional shape information, which are the results of measurement performed a plurality of times by the measurement device 10. For example, the presence or absence of the motion can be determined on the basis of whether or not the pieces of three-dimensional shape information of the object indicated by the results of measurement performed two times at a predetermined time interval are the same. If the cyclic motion is considered, the presence or absence of the motion can be determined on the basis of whether or not the pieces of three-dimensional shape information of the object indicated by the results of measurement performed three or more times at different time intervals are the same. This is because it is possible that the motion cycle coincides with the measurement interval. Also, whether it is the constant speed motion or not can be determined on the basis of whether or not three or more coordinates of the object indicated by the results of measurement performed three or more times at predetermined time intervals line up at constant intervals. Also, the information indicating the motion state can be determined by comparing the three-dimensional shapes and the coordinates of the object with each other which are indicated by the results of measurement performed a plurality of times, or calculating the difference in between. In addition, the measurement control device 20 may acquire the motion information from another device (for example, a Doppler sensor, an inertial sensor provided in the object, or the like).

In the following, a specific method for acquiring the motion information will be described.

(Determination of Presence or Absence of Motion)

For example, the measurement control device 20 (for example, the second acquisition unit 62) determines the presence or absence of the motion, by performing a matching process between the plurality of pieces of three-dimensional shape information. Specifically, the measurement control device 20 may compare the depth information for each pixel, and determine that a motion is absent if the matching ratio is equal to or higher than a threshold value, and determine that a motion is present if the matching ratio is less than the threshold value. It is possible that, even in the case where a stationary object is measured, the result of measurement changes, depending on the accuracy of the measurement device 10, and thus the improvement of the determination accuracy can be achieved by using the plurality of pieces of three-dimensional shape information in the determination.

(Determination of Presence or Absence of Cyclicity of Motion)

For example, the measurement control device 20 (for example, the second acquisition unit 62) determines the presence or absence of the cyclicity of the motion, by performing the matching process between the plurality of pieces of three-dimensional shape information. Specifically, the measurement control device 20 first sets reference three-dimensional shape information, and detects a cyclic motion having a cycle of a time interval when the three-dimensional shape information whose matching ratio with the reference three-dimensional shape information is equal to or higher than a threshold value appears at the predetermined time interval. This point will be described with reference to FIG. 2.

Figure 2:
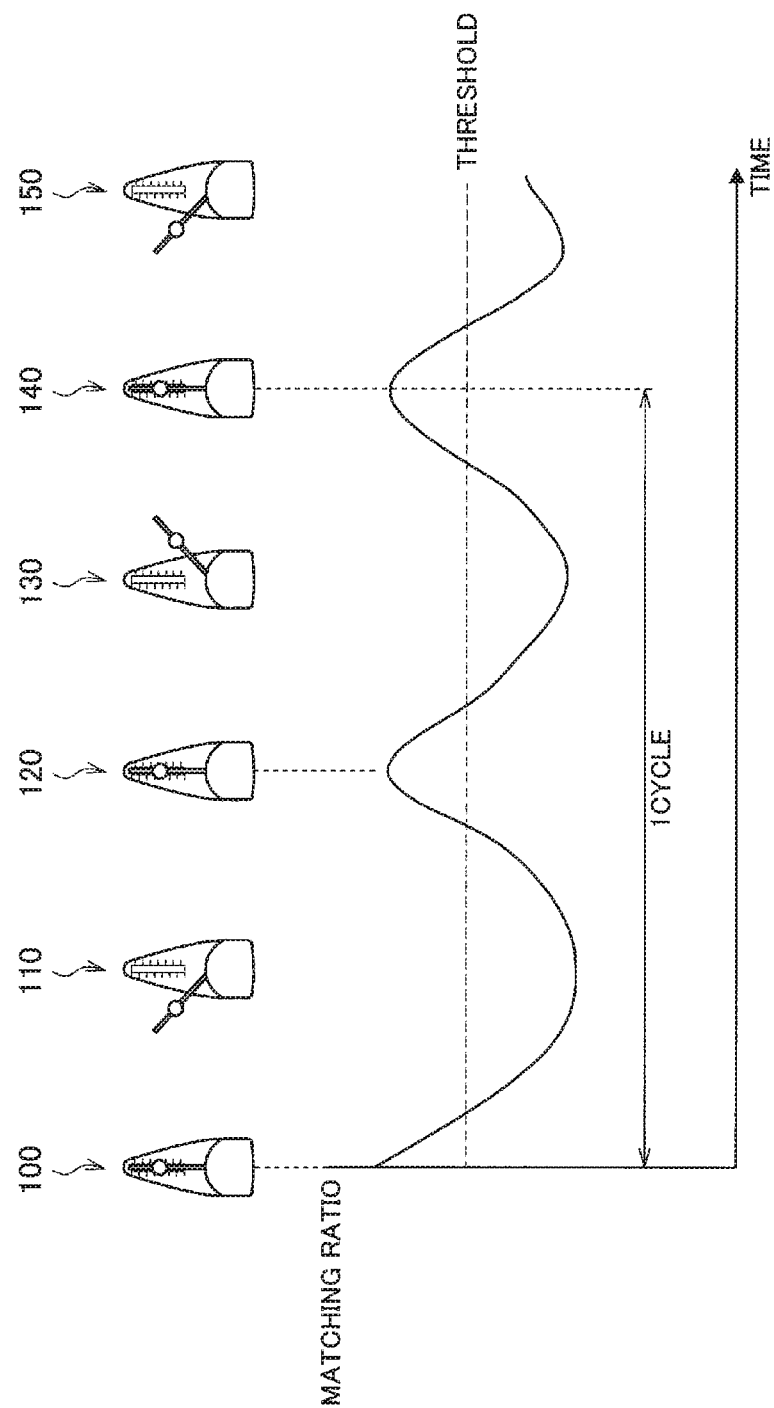
FIG. 2 is an explanatory diagram for describing a determination process of cyclicity of motion by a measurement control device according to the present embodiment.

FIG. 2 is an explanatory diagram for describing a determination process of cyclicity of the motion by the measurement control device 20 according to the present embodiment. In the example illustrated in FIG. 2, the matching ratios between the three-dimensional shape information acquired at a reference phase 100 and the three-dimensional shape information acquired at a phase 120 and a phase 140 are equal to or higher than a threshold value. Hence, the measurement control device 20 can determine the phase 100 to the phase 120, or the phase 100 to the phase 140, as one cycle. However, if the phase 100 to the phase 120 is one cycle, the matching ratio of the three-dimensional shape information between the phase 110 and the phase 130 that should be the same phase is lower than the threshold value. On the other hand, if the phase 100 to the phase 140 is one cycle, the matching ratio of the three-dimensional shape information between the phase 110 and the phase 150 that should be the same phase is equal to or higher than the threshold value. Hence, the measurement control device 20 determines the phase 100 to the phase 140 as one cycle.

The above matching process may be performed to all of the pieces of acquired three-dimensional shape information, or may be performed targeting a part of the three-dimensional shape information or a part of unique points in the three-dimensional shape information, for the purpose of speeding up. In the calculation of the matching process, a sum of squared difference (SSD), a sum of absolute difference (SAD), or the like can be used, in the case where all points of the depth information are targeted, for example. A matching ratio $D_{SSD}$ in the SSD and a matching ratio $D_{SAD}$ in the SAD are expressed by next equations.

[Math. 1]

$$D_{SSD} = \sum_{y=0}^{N-1} \sum_{x=0}^{M-1} |D_t(x, y) - D_{t-1}(x, y)|^2 \qquad (1)$$

[Math. 2]

$$D_{SAD} = \sum_{y=0}^{N-1} \sum_{x=0}^{M-1} |D_t(x, y) - D_{t-1}(x, y)| \qquad (2)$$

Here, x is a coordinate of x axis, and has a value from 0 to M−1. Y is a coordinate of y axis, and has a value from 0 to N−1. Dt(x, y) is a depth at the coordinates (x, y) at a time point t.

The threshold value of the matching ratio can be set on the basis of a default value or a user instruction.

(Determination of Motion Pattern)

For example, the measurement control device 20 (for example, the second acquisition unit 62) determines the motion pattern, by performing the matching process between the plurality of pieces of three-dimensional shape information. In the following, an example of a determination method will be described.

FIRST EXAMPLE

For example, the measurement control device 20 may estimate the displacement of individual pieces of data by performing 3D motion estimation targeting the pieces of three-dimensional shape information that are adjacent on the time axis, targeting all of the acquired pieces of three-dimensional shape information.

Figure 3:
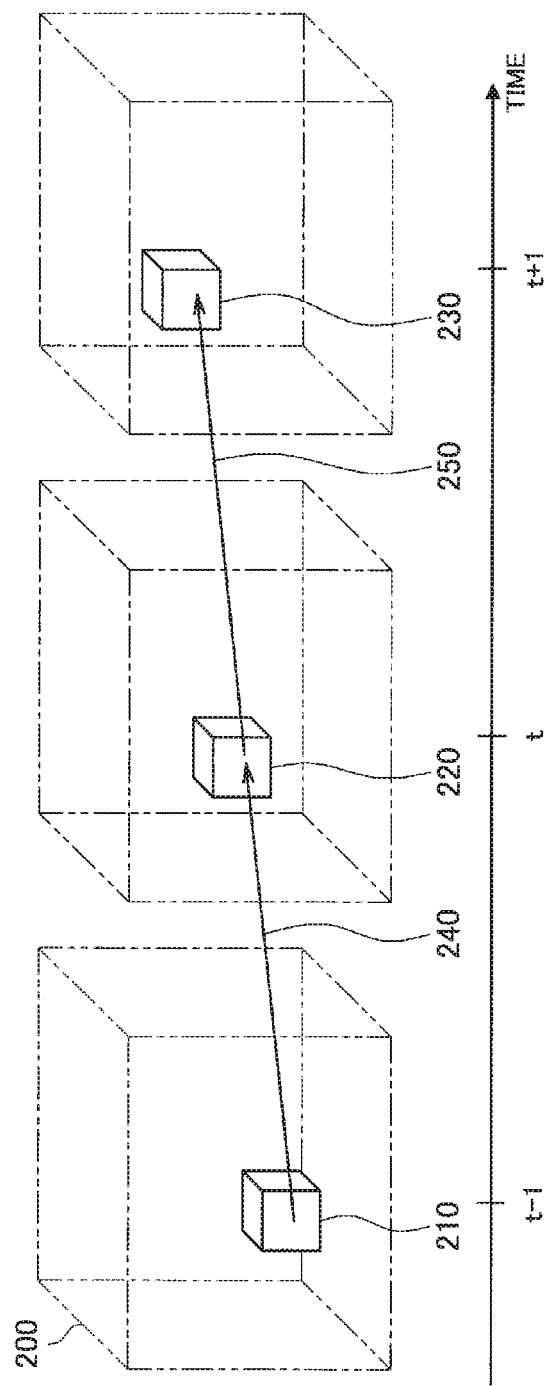
FIG. 3 is an explanatory diagram for describing a determination process of a motion pattern by the measurement control device according to the present embodiment.

The first example will be described with reference to FIG. 3. FIG. 3 is an explanatory diagram for describing a determination process of the motion pattern by the measurement control device 20 according to the present embodiment. FIG. 3 illustrates a time-series change of the three-dimensional shape information of the object that moves in a space 200. For example, the measurement control device 20 estimates a motion vector 240, targeting three-dimensional shape information 210 of the object at a time point t−1 and three-dimensional shape information 220 of the object at the time point t. Also, the measurement control device 20 estimates a motion vector 250, targeting the three-dimensional shape information 220 of the object at the time point t and three-dimensional shape information 230 of the object at a time point t+1. The measurement control device 20 can predict the three-dimensional shape information at a time point t+2, for example, by using the motion vector 240 and the motion vector 250 estimated in this way. Note that the detailed description of 3D motion estimation is described, for example, in 'Kamolrat, B.; Fernando, W. A. C.; Mrak, M.; Kondoz, A., "3D motion estimation for depth image coding in 3D video coding", Consumer Electronics, IEEE Transactions on May 2009.'

SECOND EXAMPLE

For example, the measurement control device 20 may determine a motion pattern on the basis of whether or not the motion pattern matches a plurality of motion patterns prepared in advance. In detail, first, the measurement control device 20 applies the displacement based on the motion pattern to one of a pair of the pieces of three-dimensional shape information that are adjacent on the time axis, and performs the matching process between the three-dimensional shape information after the application and the other. The measurement control device 20 performs this matching process with regard to each of the motion patterns, and extracts one or more motion patterns whose matching ratios are equal to or higher than the threshold value. Then, the measurement control device 20 performs the matching process between the simulation result according to each of the extracted motion patterns and all of the acquired pieces of three-dimensional shape information, and determines that the motion pattern whose total value of the matching ratio is equal to or larger than the threshold value and is the largest is the motion pattern of the object. A plurality of motion patterns prepared in advance are motion patterns, such as a constant speed motion or a constant speed circular motion, for example.

Figure 4:
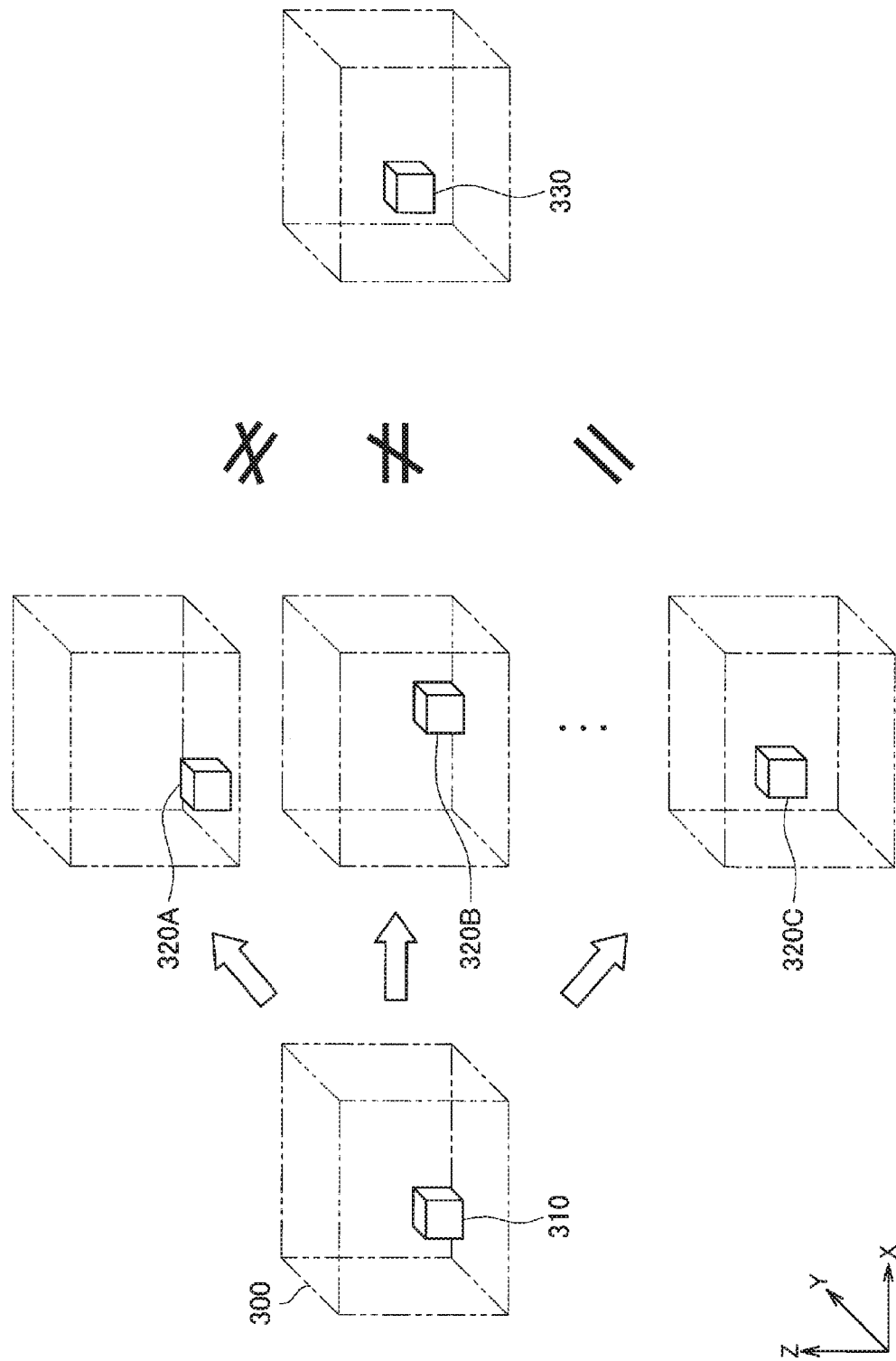
FIG. 4 is an explanatory diagram for describing a determination process of a motion pattern by the measurement control device according to the present embodiment.

A second example will be described with reference to FIG. 4. FIG. 4 is an explanatory diagram for describing a determination process of the motion pattern by the measurement control device 20 according to the present embodiment. FIG. 4 illustrates an example of time-series change of the three-dimensional shape information of the object that moves in a space 300 and a motion pattern. For example, it is assumed that three-dimensional shape information 310 is acquired at a time point t−1, and three-dimensional shape information 330 is acquired at a time point t. The measurement control device 20 generates three-dimensional shape information 320A obtained by applying the displacement based on the motion pattern that moves in −Y direction to the three-dimensional shape information 310 acquired at the time point t−1, and performs a matching process between the three-dimensional shape information 320A and the three-dimensional shape information 330. However, the matching ratio is lower than the threshold value, and thus the measurement control device 20 determines that this motion pattern is not a motion pattern of the object. The measurement control device 20 performs similar processes with regard to three-dimensional shape information 320B to which the displacement based on the motion pattern that moves in X direction is applied, three-dimensional shape information 320C to which the displacement based on the motion pattern that moves in Z direction is applied, and the like. Then, the measurement control device 20 determines that the motion pattern associated with the three-dimensional shape information 320C whose matching ratio is equal to or higher than the threshold value is the motion pattern of the object.

The first example described above can follow a complicated motion, but the calculation cost is high. On the other hand, the second example can follow limited patterns, but the calculation cost is lower. Also, in the case of the second example, it is difficult to determine the pattern of the motion in the case where the property of the motion is different at each part of the object. However, this is not true in the case where segmentation described later is performed to determine the motion pattern for each segment.

(User Input)

The motion information may be input by the user. For example, the measurement control device 20 may accept user inputs, such as the presence or absence of the motion, the presence or absence of the cyclicity of the motion, and information indicating the cycle, before measurement. Also, the measurement control device 20 may measure and recognize the motion information by using these kinds of information. This can improve the measurement accuracy, and shorten the measurement time.

(4) Integration of Results of Measurement

The measurement control device 20 (for example, the processing unit 64) has a function for processing the three-dimensional shape information, on the basis of the motion information. For example, the measurement control device 20 integrates the plurality of pieces of three-dimensional shape information on the basis of the property of the motion of the object. In the following, an example of an integration process will be described.

In the case where the property of the motion is "stationary", the measurement control device 20 performs a statistical process on the plurality of pieces of three-dimensional shape information corresponding to the stationary state. Note that the statistical process means calculating an average value, calculating a median value, calculating a mode value, deleting an outlier, or the like, with regard to the plurality of pieces of three-dimensional shape information of the target. The plurality of pieces of three-dimensional shape information acquired in the same motion state (stationary state) are integrated, thereby making it possible to improve the accuracy of the three-dimensional shape information.

In the case of a motion whose property is predictable, the measurement control device 20 performs a statistical process on the three-dimensional shape information on the basis of the predicted motion of the object. The predictable motion can also be regarded as a motion whose motion pattern is determinable. That is, the measurement control device 20 performs a statistical process on the three-dimensional shape information on the basis of the motion pattern of the object. For example, the measurement control device 20 compares the measured data with the motion pattern, and in the case where significant outlier data is found, assumes the data as an invalid value, and makes a modification by using temporally nearby data or spatially nearby data. Further, the measurement control device 20 may complement a blind angle part (i.e., occlusion) of the measurement, from the plurality of pieces of three-dimensional shape information corresponding to different motion states of the object. A complement process of the blind angle part of the measurement will be described in detail later. These integration processes can improve the accuracy of the three-dimensional shape information.

Figure 5:
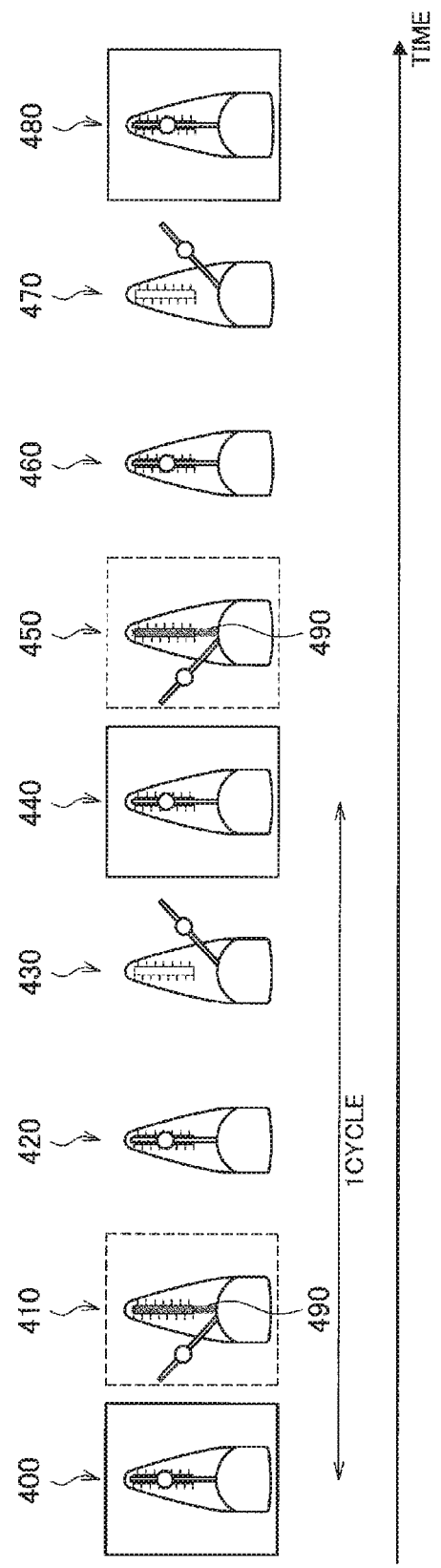
FIG. 5 is an explanatory diagram for describing a complement process of a blind angle part of measurement by the measurement control device according to the present embodiment.

In the case where the property of the motion is the cyclic motion, the measurement control device 20 performs a statistical process on the plurality of pieces of three-dimensional shape information corresponding to the motion states of the object, in the same phase, that performs the cyclic motion. For example, the measurement control device 20 calculates an average value of the pieces of three-dimensional shape information measured at the timing of the same phase in the cyclic motion, or the like. A plurality of pieces of three-dimensional shape information acquired in the same motion state (the same phase in the cyclic motion) are integrated, thereby making it possible to improve the accuracy of the three-dimensional shape information. Further, the measurement control device 20 may complement the blind angle part of the measurement, from the plurality of pieces of three-dimensional shape information corresponding to the motion states of the object, in different phases, that performs the cyclic motion. With reference to FIG. 5, the complement of the blind angle part of the measurement will be described in detail.

FIG. 5 is an explanatory diagram for describing the complement process of the blind angle part of the measurement by the measurement control device 20 according to the present embodiment. The example illustrated in FIG. 5 depicts the state of the object (metronome) in each of a phase 400 to a phase 480. As described with reference to FIG. 2, the measurement control device 20 can determine the phase 400 to the phase 440 as one cycle. For example, in the case where the phase 400 is the reference phase, the three-dimensional shape information of the blind angle part of the back side of the pendulum of the metronome which is the moving object is not included in the three-dimensional shape information of the same phase (for example, the phase 440 or the phase 480). Hence, the measurement control device 20 complements a blind angle part 490, by using the three-dimensional shape information of a different phase, such as the phase 410 or the phase 450, that includes the three-dimensional shape information of the blind angle part 490 of the back side of the pendulum of the metronome.

(5) Segmentation

The measurement control device 20 (for example, the processing unit 64) may classify the object into a plurality of segments of different motion properties, on the basis of the motion information. Thereby, the feature of the motion of the object is understood more accurately.

For example, the measurement control device 20 divides the object into a stationary region with no motion and a motion region with motion. To that end, the measurement control device 20 may align the positions of the plurality of pieces of three-dimensional shape information, and compare the pieces of three-dimensional shape information, and divide the pieces of three-dimensional shape information into a region (for example, a motion region) in which the difference is equal to or greater than a threshold value and a region (for example, a stationary region) in which the difference is smaller than the threshold value, for example. With regard to each region, in the case where there are isolated regions, the isolated regions are collectively classified into one region. Note that, if the motion region includes parts of different motion properties, the motion region may be classified further into two or more regions. In addition, the measurement control device 20 may perform segmentation by utilizing an existing segmentation technology, such as Snakes, Graph Cut, or Watershed. As a matter of course, the measurement control device 20 may use the above technologies in combination. Depth information, texture information, and the like are conceived of as the target data of the segment division.

After the segmentation, the measurement control device 20 (for example, the processing unit 64) processes the three-dimensional shape information for each segment. For example, the measurement control device 20 may integrate the pieces of three-dimensional shape information with respect to each of divided stationary region and motion region. Thereby, the three-dimensional shape information matches the feature of the motion of the object more, and it is therefore possible to improve the accuracy of the three-dimensional shape information.

(6) Measurement Control

The measurement control device 20 (for example, the measurement control unit 63) controls the measurement device 10. For example, the measurement control device 20 controls at least one of the timing, the number of times, the period, or the target area of the measurement by the measurement device 10. In addition, the measurement control device 20 may cause the measurement device 10 to execute additional measurement. With these controls, the measurement control device 20 can collect three-dimensional shape information useful for accuracy improvement.

The measurement control device 20 may control the measurement device 10 on the basis of the user input. For example, in the case where it is difficult to automatically determine in advance how many times or how long it takes to confirm the cyclicity of the motion, it is desirable that set information is input from the user. As a matter of course, the set information may be a default value.

Also, the measurement control device 20 may control the measurement device 10 on the basis of the motion information. For example, in the case where the object performs a cyclic motion, the measurement control device 20 controls the measurement interval or performs additional measurement, in order to acquire information of a different phase from that of the already-acquired three-dimensional shape information or to acquire information of the same phase as that of the already-acquired three-dimensional shape information. This makes it possible to efficiently collect three-dimensional shape information useful for achieving complementation of the blind angle by using the three-dimensional shape information of different phases or accuracy improvement by using the three-dimensional shape information of the same phase.

(7) Data Output

The measurement control device 20 (for example, the output control unit 65) causes the output unit 30 to output the information indicating the processing result. The measurement control device 20 can selectively output a part or all of the pieces of information indicating the processing result by the processing unit 64 and the motion information. For example, the measurement control device 20 selectively outputs at least one of the integrated pieces of three-dimensional shape information, the presence or absence of the motion, the presence or absence of the cyclicity of the motion, the cycle, and the motion pattern. It can be set by a user input, for example, which information should be output. Also, the measurement control device 20 can output the three-dimensional shape information on the basis of a result of any measurement among the utilized results of measurement performed a plurality of times. For example, it may be set on the basis of the user input on which result of measurement the measurement control device 20 is based. Also, the measurement control device 20 may assume the longest motion cycle in the object as one sequence, and output all the pieces of three-dimensional shape information in the sequence. Also, the measurement control device 20 may output the three-dimensional shape information for each segment.

In the above, the technical feature of the measurement system 1 according to the present embodiment has been described. Next, the sequence of the process of the measurement system 1 according to the present embodiment will be described with reference to FIGS. 6 and 7.

<<3. Sequence of Process>>

Figure 6:
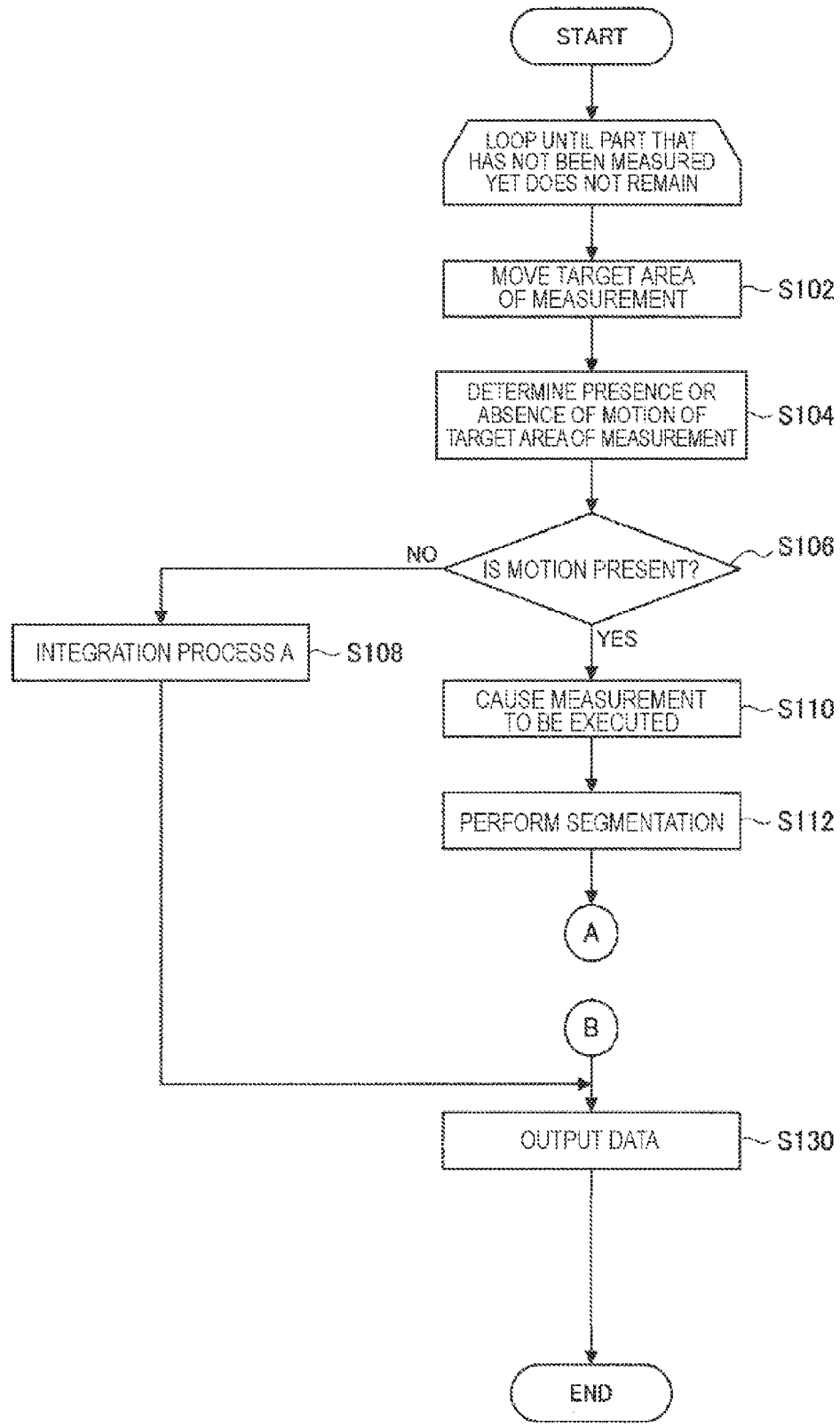
FIG. 6 is a flowchart illustrating an example of a sequence of a measurement process by the measurement system according to the present embodiment.
Figure 7:
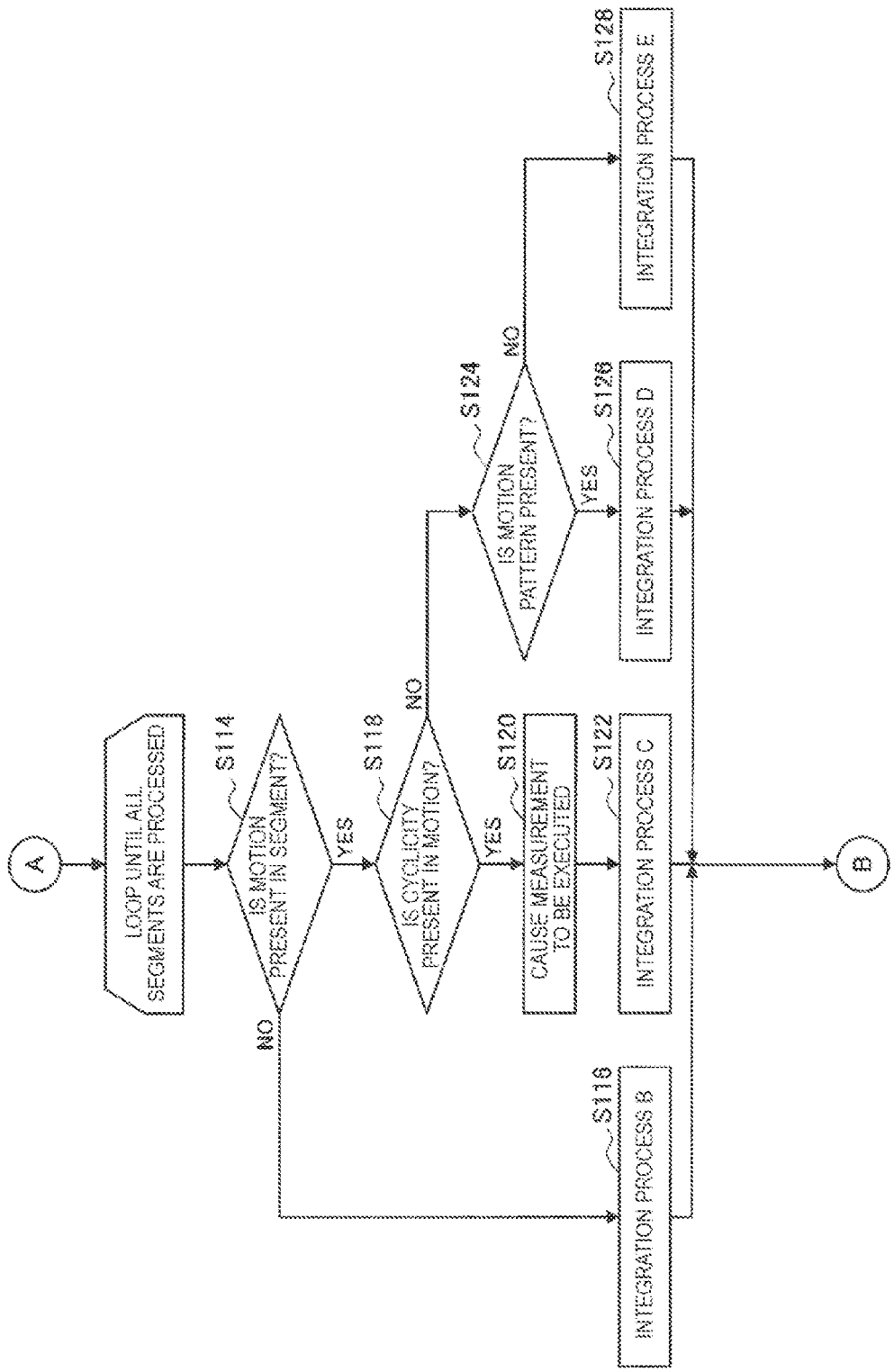
FIG. 7 is a flowchart illustrating an example of a sequence of a measurement process by the measurement system according to the present embodiment.

FIGS. 6 and 7 are flowcharts illustrating an example of the sequence of the measurement process by the measurement system 1 according to the present embodiment.

As illustrated in FIG. 6, first, the measurement control device 20 (for example, the measurement control unit 63) moves the target area of the measurement to a part that has not been measured yet in the object (step S102). Note that, in the case where the measurement device 10 is an omnidirectional type, the present step is not performed. Also, in the case where the measurement device 10 is a handy type, the measurement control device 20 outputs information to instruct the user to move the target area of the measurement.

Thereafter, the measurement control device 20 (for example, the second acquisition unit 62) determines the presence or absence of the motion of the target area of the measurement (step S104). The measurement control device 20 (for example, the first acquisition unit 61 and the measurement control unit 63) may cause the measurement device 10 to perform measurement and acquire the three-dimensional shape information as the information for determining the presence or absence of the motion.

If it is determined that a motion is absent (step S106/NO), the measurement control device 20 (for example, the processing unit 64) performs an integration process A (step S108). Specifically, the measurement control device 20 calculates an average value of the plurality of pieces of three-dimensional shape information corresponding to the stationary state, i.e., all of the acquired pieces of three-dimensional shape information, or the like. Here, in the case where the measurement is performed by the measurement device 10 in step S104, the pieces of three-dimensional shape information acquired at that time become the target of integration. In the case where the measurement is not performed by the measurement device 10 in step S104, the measurement control device 20 sets, as the target of integration, the plurality of pieces of three-dimensional shape information acquired by causing measurement to be performed newly. Thereafter, the process proceeds to step S130.

On the other hand, in the case where it is determined that a motion present (step S106/YES), the measurement control device 20 (for example, the first acquisition unit 61 and the measurement control unit 63) causes the measurement device 10 to execute the measurement, and acquires the three-dimensional shape information (step S110), as illustrated in FIG. 7. The set information such as the timing, the number of times, the period, or the target area of the measurement is a user input value or a default value.

Thereafter, the measurement control device 20 (for example, the processing unit 64) performs segmentation (step S112). For example, the measurement control device 20 divides the object into the stationary region with no motion and the motion region with motion.

Next, the measurement control device 20 (for example, the second acquisition unit 62) determines whether or not a motion is present in the segments (step S114). For example, the measurement control device 20 performs determination by performing the matching process that uses the plurality of pieces of three-dimensional shape information for each segment.

In the case where it is determined that a motion is absent in the segments (step S114/NO), the measurement control device 20 (for example, the processing unit 64) performs an integration process B (step S116). Specifically, the measurement control device 20 calculates an average value of the plurality of pieces of three-dimensional shape information corresponding to the stationary state, i.e., all of the pieces of three-dimensional shape information acquired with regard to the segments, or the like.

On the other hand, in the case where it is determined that a motion is present in the segments (step S114/YES), the measurement control device 20 (for example, the second acquisition unit 62) determines whether or not cyclicity is present in the motion (step S118).

In the case where it is determined that cyclicity is present in the motion (step S118/YES), the measurement control device 20 (for example, the measurement control unit 63) causes the measurement device 10 to execute additional measurement (step S120). This is because the information of a different phase from that of the three-dimensional shape information acquired already in step S110 is acquired, or because the information of the same phase is further acquired. Thereafter, the measurement control device 20 (for example, the processing unit 64) performs an integration process C (step S122). Specifically, the measurement control device 20 complements the blind angle part of the measurement from the plurality of pieces of three-dimensional shape information corresponding to the motion states in the different phases, by calculating the average value of the plurality of pieces of three-dimensional shape information corresponding to the motion states of the object, in the same phase, that performs the cyclic motion, or the like.

On the other hand, in the case where it is determined that cyclicity is absent in the motion (step S118/YES), the measurement control device 20 (for example, the second acquisition unit 62) determines the presence or absence of the motion pattern (step S124). For example, the measurement control device 20 performs determination of the motion pattern, and determines that a motion pattern is present in the case where measurement control device 20 succeeds in the determination of the motion pattern, and determines that a motion pattern is absent in the case where the measurement control device 20 fails in the determination of the motion pattern.

In the case where it is determined that a motion pattern is present (step S124/YES), the measurement control device 20 (for example, the processing unit 64) performs an integration process D (step S126). For example, the measurement control device 20 compares the measured data with the motion pattern, and in the case where significant outlier data is found, assumes the data as an invalid value, and makes a modification by using temporally nearby data or spatially nearby data On the other hand, in the case where it is determined that a motion pattern is absent (step S124/NO), the measurement control device 20 (for example, the processing unit 64) performs an integration process E (step S128). Specifically, the measurement control device 20 selects one piece of three-dimensional shape information to be output, from among the plurality of pieces of three-dimensional shape information. For example, the measurement control device 20 may select the three-dimensional shape information acquired by the last measurement, among measurement performed a plurality of times in step S110. In that case, the time interval from the measurement time point of the three-dimensional shape information output in step S130 described later to the measurement time point of the measurement performed next becomes shorter, thereby making it possible to improve the consistency with the next output.

The measurement control device 20 performs the processes according to step S114 to step S128 described above, with regard to all segments classified in step S112.

Then, the measurement control device 20 (for example, the output control unit 65 and the output unit 30) outputs data. For example, the measurement control device 20 outputs the motion information and the three-dimensional shape information which is the processing result by the integration process A, B, C, D or E.

The measurement control device 20 performs the processes according to step S102 to step S130 described above, until a part that has not been measured yet does not remain in the object. Note that the target area of the measurement by the measurement device 10 performed in one loop is assumed to be the same.

By the above, the process ends.

<<4. Hardware Configuration Example>>

Figure 8:
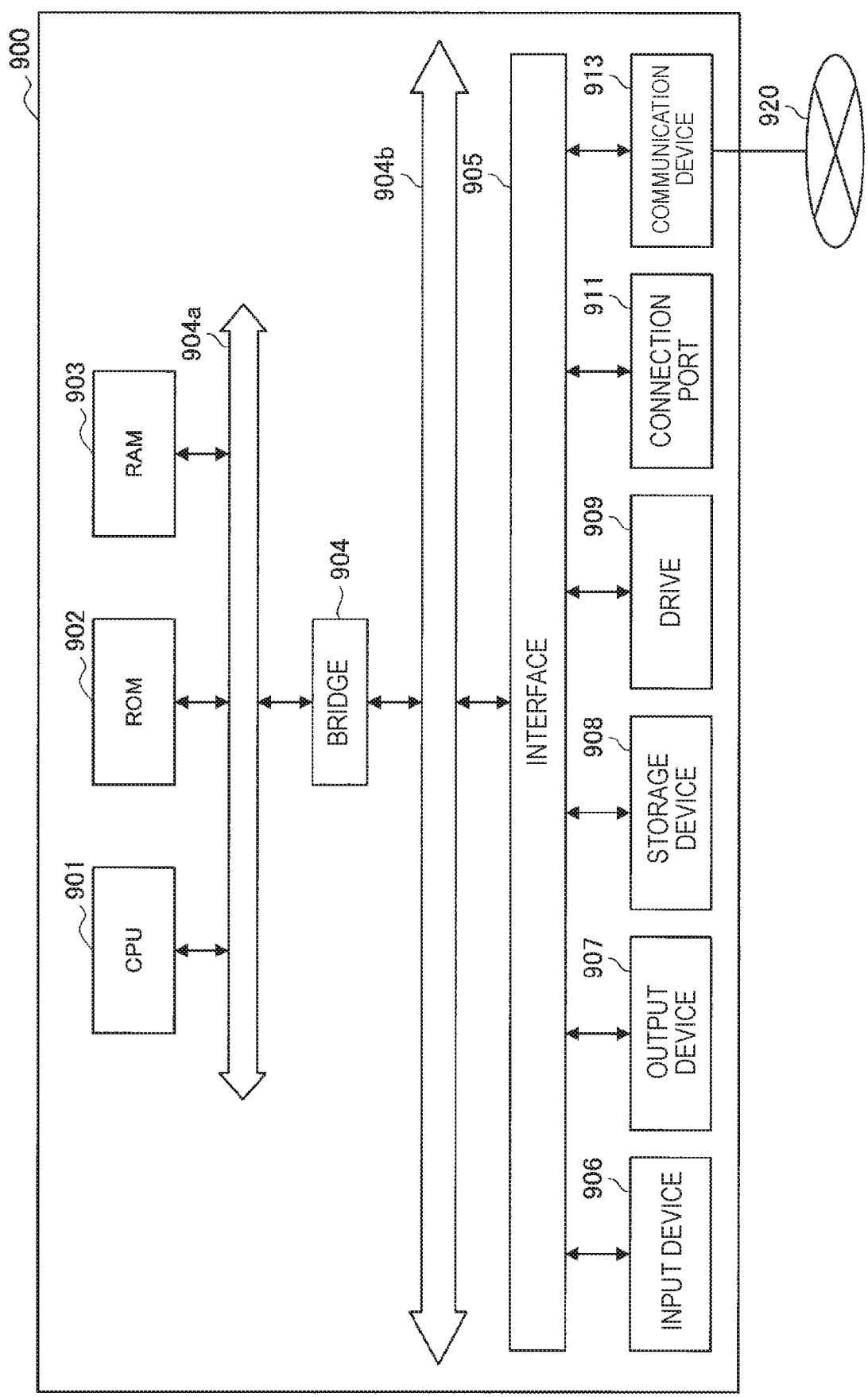
FIG. 8 is a block diagram illustrating an example of a hardware configuration of an information processing apparatus according to the present embodiment.

Finally, a hardware configuration of an information processing apparatus according to the present embodiment will be described with reference to FIG. 8. FIG. 8 is a block diagram illustrating an example of the hardware configuration of the information processing apparatus according to the present embodiment. Meanwhile, the information processing apparatus 900 illustrated in FIG. 8 may realize the measurement control device 20 illustrated in FIG. 1, for example. Information processing by the measurement control device 20 according to the present embodiment is realized according to cooperation between software and hardware described below.

As illustrated in FIG. 8, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. For example, the CPU 901 is able to constitute the control unit 60 illustrated in FIG. 1.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a cellular phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906. For example, the input device 906 can be included in the input unit 40 illustrated in FIG. 1.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals. The aforementioned display device or the sound output device may form the output unit 30 illustrated in FIG. 1, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 50 illustrated in FIG. 1, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

<<5. Conclusion>>

In the above, an embodiment of the present disclosure has been described in detail, with reference to FIGS. 1 to 8. As described above, the measurement control device 20 acquires the three-dimensional shape information and the motion information that corresponds to the three-dimensional shape information, and processes the three-dimensional shape information on the basis of the motion information. The measurement control device 20 can further improve the measurement accuracy of the three-dimensional shape of the object, by processing the three-dimensional shape information on the basis of the motion information at the timing of measurement. Specifically, the measurement control device 20 can improve the measurement accuracy with regard to the moving object, by adaptively integrating the plurality of pieces of three-dimensional shape information on the basis of the property of the motion of the object, i.e., by making the integration means variable.

In recent years, the technology relevant to 3D scanning of the moving object has been actively developed, and has had wide application fields, such as a medical field and an industrial field. The present technology is highly compatible with an existing 3D scanning system at the point of performing the process based on the three-dimensional shape information obtained by the measurement device 10, and the technology is easy to employ. Thus future utilization is expected sufficiently, in combination with increase in the necessity of 3D scanning of the moving object. Also, the measurement device 10 and the measurement control device 20 can be configured as different devices, and therefore the above-described accuracy improvement can be achieved easily, simply by newly combining the measurement control device 20 with the existing measurement device 10.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, an example in which the measurement device 10 and the measurement control device 20 are configured as different devices is described, but the present technology is not limited to this example. For example, the measurement device 10 and the measurement control device 20 may be integrated and configured as a single device.

Further, the measurement control device 20 may be configured as a single device, and a part or all of the measurement control device 20 may be configured as different devices. For example, in the functional configuration example of the measurement control device 20 illustrated in FIG. 1, the storage unit 50 and the control unit 60 may be provided in a device such as a server connected to the measurement device 10, the output unit 30, and the input unit 40 via a network or the like.

Note that it is not necessary for the processing described in this specification with reference to the flowchart and the sequence diagram to be executed in the order shown. Some of processing steps may be performed in parallel. Further, some of additional steps may be adopted, or some processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a first acquisition unit configured to acquire three-dimensional shape information indicating a result of measurement of a three-dimensional shape of an object;
a second acquisition unit configured to acquire information indicating a motion of the object corresponding to the three-dimensional shape information acquired by the first acquisition unit; and
a processing unit configured to process the three-dimensional shape information acquired by the first acquisition unit, on a basis of the information indicating the motion of the object acquired by the second acquisition unit.

(2)
The information processing apparatus according to (1), in which
the processing unit integrates the plurality of pieces of three-dimensional shape information on a basis of a property of the motion of the object.

(3)
The information processing apparatus according to (2), in which
the processing unit performs a statistical process on the plurality of pieces of three-dimensional shape information corresponding to a stationary state.

(4)
The information processing apparatus according to (2) or (3), in which
the processing unit performs a statistical process on the three-dimensional shape information on a basis of a predicted motion of the object.

(5)
The information processing apparatus according to any one of (2) to (4), in which
the processing unit performs a statistical process on the plurality of pieces of three-dimensional shape information corresponding to motion states of the object in a same phase, the object performing a cyclic motion.

(6)
The information processing apparatus according to any one of (3) to (5), in which
the statistical process includes calculating an average value, calculating a median value, calculating a mode value, or deleting an outlier, with regard to the plurality of pieces of three-dimensional shape information of a target.

(7)
The information processing apparatus according to any one of (2) to (6), in which
the processing unit complements a blind angle part of measurement, from the plurality of pieces of three-dimensional shape information corresponding to different motion states of the object.

(8)
The information processing apparatus according to (7), in which
the processing unit complements the blind angle part of the measurement, from the plurality of pieces of three-dimensional shape information corresponding to motion states of the object in different phases, the object performing a cyclic motion.

(9)
The information processing apparatus according to any one of (1) to (8), further including:
a measurement control unit configured to control a measurement device that measures the three-dimensional shape of the object, on the basis of the information indicating the motion of the object.

(10)
The information processing apparatus according to (9), in which
the measurement control unit controls at least one of a timing, a number of times, a period, or a target area of measurement.

(11)
The information processing apparatus according to (9) or (10), in which
the measurement control unit causes the measurement device to execute additional measurement.

(12)
The information processing apparatus according to any one of (1) to (11), in which
the processing unit classifies the object into a plurality of segments having different properties of the motion, on the basis of the information indicating the motion.

(13)
The information processing apparatus according to (12), in which
the processing unit processes the three-dimensional shape information for each of the segments.

(14)
The information processing apparatus according to any one of (1) to (13), in which
the second acquisition unit acquires the information indicating the motion on a basis of the plurality of pieces of three-dimensional shape information.

(15)
The information processing apparatus according to any one of (1) to (14), in which
the second acquisition unit acquires the information indicating the motion of the object at a timing when the three-dimensional shape of the object is measured.

(16)
The information processing apparatus according to any one of (1) to (15), further including:
an output unit configured to selectively output a part or all of pieces of information indicating a processing result by the processing unit and the information indicating the motion.

(17)
An information processing method including:
acquiring three-dimensional shape information indicating a result of measurement of a three-dimensional shape of an object;
acquiring information indicating a motion of the object corresponding to the acquired three-dimensional shape information; and
processing, by a processor, the three-dimensional shape information on a basis of the acquired information indicating the motion of the object.

(18)
A program for causing a computer to function as:
a first acquisition unit configured to acquire three-dimensional shape information indicating a result of measurement of a three-dimensional shape of an object;
a second acquisition unit configured to acquire information indicating a motion of the object corresponding to the three-dimensional shape information acquired by the first acquisition unit; and
a processing unit configured to process the three-dimensional shape information acquired by the first acquisition unit, on a basis of the information indicating the motion of the object acquired by the second acquisition unit.

REFERENCE SIGNS LIST 1 measurement system
10 measurement device 20 measurement control device
30 output unit
40 input unit
50 storage unit
60 control unit
61 first acquisition unit
62 second acquisition unit
63 measurement control unit
64 processing unit
65 output control unit

The invention claimed is:

1. An information processing apparatus, comprising:
a first acquisition unit configured to acquire a plurality of pieces of three-dimensional shape information, wherein
the acquired plurality of pieces of three-dimensional shape information indicates a result of measurement of a three-dimensional shape of an object, and
each of the acquired plurality of pieces of three-dimensional shape information corresponds to a respective motion state of different motion states of the object;
a second acquisition unit configured to acquire motion information indicating a motion of the object, wherein the acquired motion information corresponds to the acquired plurality of pieces of three-dimensional shape information; and
a processing unit configured to:
process the plurality of pieces of three-dimensional shape information based on the acquired motion information; and
complement a blind angle part of the measurement, from the plurality of pieces of three-dimensional shape information.

2. The information processing apparatus according to claim 1, wherein the processing unit is further configured to execute a statistical process on the acquired plurality of pieces of three-dimensional shape information.

3. The information processing apparatus according to claim 1, wherein
the acquired motion information indicates a cyclic motion of the object,
the processing unit is further configured to execute a statistical process on specific pieces of the acquired plurality of pieces of three-dimensional shape information,
the specific pieces of three-dimensional shape information correspond to specific motion states of the object in a same phase of the cyclic motion, and
the different motion states of the object include the specific motion states of the object.

4. The information processing apparatus according to claim 2, wherein the statistical process includes at least one of calculation of an average value of the acquired plurality of pieces of three-dimensional shape information, calculation of a median value of the acquired plurality of pieces of three-dimensional shape information, calculation of a mode value of the acquired plurality of pieces of three-dimensional shape information, or deletion of an outlier associated with the acquired plurality of pieces of three-dimensional shape information.

5. The information processing apparatus according to claim 1, wherein
the acquired motion information indicates a cyclic motion of the object,
the processing unit is further configured to compliment the blind angle part of the measurement, from specific pieces of the acquired plurality of pieces of three-dimensional shape information,
the specific pieces of three-dimensional shape information correspond to specific motion states of the object in different phases of the cyclic motion, and
the different motion states of the object include the specific motion states of the object.

6. The information processing apparatus according to claim 1, further comprising a measurement control unit configured to control a measurement device, wherein the measurement device measures the three-dimensional shape of the object based on the motion information indicating.

7. The information processing apparatus according to claim 6, wherein the measurement control unit is further configured to control at least one of a timing of the measurement, a number of times of the measurement, a period of the measurement, or a target area of the measurement.

8. The information processing apparatus according to claim 6, wherein the measurement control unit is further configured to control the measurement device to execute additional measurement of the three-dimensional shape of the object.

9. The information processing apparatus according to claim 1, wherein the processing unit is further configured to classify the object, into a plurality of segments having different properties of the motion, based on the motion information.

10. The information processing apparatus according to claim 9, wherein the processing unit is further configured to process each of the acquired plurality of pieces of three-dimensional shape information for a respective segment of the plurality of segments.

11. The information processing apparatus according to claim 1, wherein the second acquisition unit is further configured to acquire the motion information based on the acquired plurality of pieces of three-dimensional shape information.

12. The information processing apparatus according to claim 1, wherein the second acquisition unit is further configured to acquire the motion information when the three-dimensional shape of the object is measured.

13. The information processing apparatus according to claim 1, further comprising an output unit configured to output at least one piece of specific information,
wherein the specific information indicates each of a processing result of the processed plurality of pieces of three-dimensional shape information and the acquired motion information.

14. An information processing method, comprising:
acquiring a plurality of pieces of three-dimensional shape information, wherein the acquired plurality of pieces of three-dimensional shape information indicates a result of measurement of a three-dimensional shape of an object, and
each of the acquired plurality of pieces of three-dimensional shape information corresponds to a respective motion state of different motion states of the object;
acquiring motion information indicating a motion of the object, wherein the acquired motion information corresponds to the acquired plurality of pieces of three-dimensional shape information;
processing the plurality of pieces of three-dimensional shape information based on the acquired motion information; and complementing a blind angle part of the measurement, from the plurality of pieces of three-dimensional shape information.

15. A non-transitory computer-readable medium having stored thereon computer-executable instructions, which when executed by a computer, cause the computer to execute operations, the operations comprising:
- acquiring a plurality of pieces of three-dimensional shape information, wherein
  - the acquired plurality of pieces of three-dimensional shape information indicates a result of measurement of a three-dimensional shape of an object, and
  - each of the acquired plurality of pieces of three-dimensional shape information corresponds to a respective motion state of different motion states of the object;
- acquiring motion information indicating a motion of the object, wherein the acquired motion information corresponds to the acquired plurality of pieces of three-dimensional shape information;
- processing the plurality of pieces of three-dimensional shape information based on the acquired motion information; and
- complementing a blind angle part of the measurement, from the plurality of pieces of three-dimensional shape information.

* * * * *